United States Patent [19]
MacIsaac

[11] Patent Number: 4,550,926
[45] Date of Patent: Nov. 5, 1985

[54] VEHICLE SUSPENSION SYSTEM

[76] Inventor: William L. MacIsaac, 7911 40th Ave. West, Everett, Wash. 98203

[21] Appl. No.: 594,329

[22] Filed: Mar. 28, 1984

[51] Int. Cl.$^4$ .............................................. B62D 9/02
[52] U.S. Cl. ................................ 280/112 A; 280/772
[58] Field of Search .................. 280/112 A, 675, 689, 280/772

[56] References Cited
U.S. PATENT DOCUMENTS

| | | | |
|---|---|---|---|
| 2,152,938 | 4/1939 | Welch | 280/112 |
| 2,234,676 | 3/1941 | Kolbe | 280/124 |
| 2,643,897 | 6/1953 | Chowning | 280/112 |
| 2,689,747 | 9/1954 | Kolbe | 280/112 |
| 2,787,473 | 4/1957 | Chiodo | 280/112 |
| 2,791,440 | 6/1957 | Guidobaldi | 280/112 A |
| 2,794,652 | 6/1957 | Kolbe | 280/112 |
| 2,978,255 | 4/1961 | Rosenkrands | 280/112 |
| 3,137,513 | 6/1964 | Marot | 280/112 |
| 3,150,882 | 10/1964 | Corbin | 280/112 |
| 3,261,621 | 7/1966 | Corbin | 280/96.2 |
| 3,365,212 | 1/1968 | Powers | 280/87 |
| 3,408,088 | 10/1968 | Corbin | 280/96.2 |
| 3,567,243 | 3/1971 | Ruhin | 280/96.2 |
| 3,598,385 | 8/1971 | Parsons, Jr. | 267/20 |
| 3,604,724 | 9/1971 | Corbin | 280/96.2 |
| 3,692,324 | 10/1972 | Corbin | 280/96.2 |
| 3,711,113 | 1/1973 | Stammreich | 280/675 |
| 3,799,565 | 3/1974 | Burtis et al. | 280/16 |
| 4,484,767 | 11/1984 | Klem | 280/112 A |

FOREIGN PATENT DOCUMENTS

| | | | |
|---|---|---|---|
| 1183805 | 12/1964 | Fed. Rep. of Germany | 280/112 A |
| 3020982 | 12/1981 | Fed. Rep. of Germany | 280/689 |
| 1213795 | 11/1970 | United Kingdom | 280/112 A |

OTHER PUBLICATIONS

"Tech Tips—The Idea Newsletter for Racing Competitors", vol. 4, No. 10, May 1977.
Hall, Jim, "What Makes Cars Handle?", Car and Driver, Apr. 1965, p. 51.
Hall, Jim, "What Makes Cars Handle? Part II", Car and Driver, May 1965, p. 77.

Primary Examiner—Joseph F. Peters, Jr.
Assistant Examiner—Ross Weaver
Attorney, Agent, or Firm—Christensen, O'Connor, Johnson & Kindness

[57] ABSTRACT

A suspension system (16a) for a vehicle (12a) is composed of wheels (18, 19) that are mounted on wheel-mounting members (20) journalled within upright axle carriers (24) on opposite sides of a body (14). Spring assemblies (114, 116) are mounted either directly on the wheel-mounting members (20) or on lower trailing arms (62) at locations closely adjacent axle carriers 24, with the upper ends of the spring assemblies connected to overhead portions (120) of body (14) for supporting substantially the entire weight of the body directly on the wheel-mounting members. A pair of upper and lower trailing arms (60, 62) are pivotally mounted on axle carriers (24) while the opposite ends of the trailing arms are pivotally connected to upright members (72a). A tie assembly (82) extends transversely across body (14) to pivotally interconnect with the lower portions of upright members (72a). The central portions of tie assembly (82) is pivotally connected to body (14) at a roll axis (92) located above the center of gravity (94) of the body. The outer ends of a pair of upper, generally transverse link members (100, 102) are pivotally connected to the upper end portions of upright members (72a) while the inward ends of the link members are pivotally connected to the vehicle body (14) at locations above roll axis (92).

31 Claims, 11 Drawing Figures

VEHICLE SUSPENSION SYSTEM

TECHNICAL FIELD

The present invention relates to suspension systems for vehicles, and more particularly to a suspension system to counteract the lateral forces imposed on a vehicle during cornering.

BACKGROUND OF THE INVENTION

When negotiating a curve with a typical automotive type of vehicle, the resulting centrifugal forces acting on the vehicle tend to roll the vehicle body and associated chassis (hereinafter jointly referred to as "body") about its "roll center" relative to the underlying suspension system, and also tend to displace the body and suspension system laterally outwardly tending to cause the vehicle to pivot about its outer wheels. This latter tendency is commonly known in the art as the "jacking effect." The location of the roll center is a function of the construction of the body and the configuration of the vehicle suspension system. In a conventional vehicle, the center of gravity of the vehicle is located above the roll center. Since the centrifugal forces act through the center of gravity of the vehicle, the magnitude of the couple intending to cause the body to roll about its roll center is a function of the magnitude of the centrifugal force and the vertical distance separating the center of gravity from the roll center. This vertical distance is commonly known as the "roll couple."

As the body rolls outwardly about is roll center, it tends to compress the outer suspension springs (relative to the center of the corner about which the vehicle is traveling) thus increasing the weight on the outer wheels while simultaneously unloading the inward suspension springs thereby reducing the weight on the inside wheels. As a result, the cornering traction of the vehicle is reduced.

The lateral force tending to cause the vehicle to pivot about its outer wheels, i.e. "jacking effect," acts through the portion of the vehicle known as the "reaction center." In a conventional vehicle, the reaction center coincides with the roll center. As a result, the magnitude of the jacking effect is a function of the magnitude of the centrifugal force and the elevation of the reaction center (roll center) above the ground. The height of the reaction center above the ground is commonly known as the "jacking couple."

In conventional vehicles, attempts have been made to locate the reaction center as low as possible, thereby minimizing the jacking effect. Placement of the reaction center at a low elevation, however, results in the center of gravity of the body being located at a substantial distance above the roll center thereby increasing the magnitude of the roll couple and, thus, the amount of body roll. It is to be appreciated that in a typical suspension system, the body roll and jacking effect are cumulative, both reducing the cornering ability of the vehicle.

The lateral forces generated during cornering also cause the vehicle passengers to slide sideways in their seats making it uncomfortable for the passengers. Moreover, the roll of the body during cornering is transmitted through the suspension system and changes the camber of the wheels, causing the wheels to tilt outwardly relative to the center of the corner about which the vehicle is traveling. As is well known in the art, this outward tilt of the wheels produces a side thrust ("camber thrust") tending to force the wheels in the same direction as the wheels are tilted, i.e., outwardly. As a result, tire traction is reduced.

In the past, attempts have been made to counteract the negative effects on the vehicle body suspension system and tires caused by lateral forces imposed on the vehicle during cornering. For instance, vehicles have been designed, in theory, to cause the vehicle body to tilt inwardly during cornering. In one such type of vehicle, the body is tilted with a linkage system powered by an electric motor. The motor is selectively actuated by the driver. The impracticality and inconvenience of this type of system, such as disclosed by U.S. Pat. No. 2,152,938, is clear.

In another type of vehicle, the wheels and body are tilted into a curve by a hydraulic system employing various pumps, valves, relays, reservoirs and other associated components. The operation of the hydraulic system is controlled by a valve that is actuated by the steering shaft of the vehicle. This type of hydraulic system, as disclosed in U.S. Pat. No. 2,787,473, significantly increases the complication and cost of the vehicle suspension system.

Further attempts have been made to counteract the negative effects caused by the cornering forces on vehicles by designing the suspension system so that the roll center of the vehicle body is disposed above its center of gravity. As a result, the lateral forces acting through the center of gravity tend to tilt the body about its roll center inwardly into the curve. Examples of such systems are disclosed by U.S. Pat. Nos. 2,689,747; 2,791,440; 3,150,882; and 3,598,385. These types of suspension systems typically suffer from one or more negative features, such as being far too complicated for mass production of passenger vehicles. Also, in these types of suspension systems the outside springs are highly loaded while the inside springs are relatively unloaded during cornering, thus, counteracting the gain in cornering ability achieved by tilting the body inwardly about its roll center. In addition, in designing the vehicle so that the roll center is located above the center of gravity, the elevation of the reaction center typically must be raised upwardly relative to the ground to such an extent that a high jacking effect results. This also counteracts the gain in cornering ability achieved by the inward tilting of the vehicle body. Another common drawback of these types of suspension systems is that the weight of the vehicle must be carried by the components of the suspension system that are utilized to cause the body to tilt inwardly when cornering, thereby requiring that these components be designed large enough to safely accommodate such loads. This can substantially increase the weight of the vehicle.

Accordingly, it is a principle object of the present invention to provide a vehicle in which the roll couple and the jacking couple oppose each other thereby causing the body roll to counteract the jacking effect, thus improving the cornering traction of the vehicle.

It is a particular object of the present invention to provide a suspension system for a vehicle in which the body rolls toward the inside of the corner when turning, while simultaneously increasing the downward load on the inside wheels without increasing the jacking effect imposed on the vehicle.

It is also a particular object of the present invention to provide a vehicle suspension system in which the reaction center is separate from and located at an elevation below the roll center.

It is a further object of the present invention to provide a vehicle suspension system in which the antiroll bar or other similar devices employed to control the roll of the vehicle body does not effect the function of the road springs of the vehicle.

It is another object of the present invention to provide a suspension system for a vehicle that counteracts the lateral forces imposed on the vehicle while cornering and that also is of sufficiently uncomplicated and inexpensive construction to enable the suspension system to be employed on modern, mass-produced vehicles.

An additional object of the present invention is to provide a vehicle suspension system in which the camber of the wheels is selectively controlled so that it can be varied during cornering.

SUMMARY OF THE INVENTION

The foregoing and other objects are achieved in accordance with the present invention by employing a vehicle suspension system that is pivotally joined to the vehicle body at a roll center located above the center of gravity of the vehicle body so that the lateral cornering forces acting through the center of gravity tilt the body about its roll center inwardly into the curve, i.e., toward the center of the corner about which the vehicle is traveling. To this end, the suspension system includes tie assemblies that are pivotally connected to the body along a longitudinal axis, i.e., the roll center. At other locations the tie assemblies are interconnected to the wheels or other means employed for supporting the vehicle in such a manner that the roll axis shifts laterally outward relative to the vehicle wheels during cornering in a direction away from the center of the corner that the vehicle is negotiating. Consequently, the vehicle roll center or axis does not serve as the reaction center; instead, the reaction center is located at a lower elevation on the suspension system which results in a lesser jacking effect than if the roll center also served as the reaction center of the vehicle.

A first generalized form of the present invention concerns an independent type of suspension system wherein the tie assemblies extend laterally across the body. An intermediate portion(s) of the tie assemblies is connected to the body about a longitudinal roll axis disposed at an effective elevation above the center of gravity of the body. The outer ends of the tie assemblies are pivotally interconnected with the ends of arm assemblies. The opposite ends of the arm assemblies are pivotally interconnected with wheel-mounting members. The wheel-mounting members have stub axles on which the vehicle wheels are mounted. The use of the arm assemblies permits the wheels to move up and down independently of the transverse tie assemblies, for instance, when traveling over bumps or depressions in the road surface.

The lower ends of spring assemblies are mounted on the arm assemblies closely adjacent the wheel-mounting members and the upper ends of the spring assemblies are secured to overhead portions of the body so that the weight of the body is carried substantially directly on the wheel-mounting members, rather than requiring the suspension system components to bear the body weight. By this construction, when the body tilts inwardly during cornering, the body imposes a downward load on the inside spring assemblies that is transmitted directly to the inside wheels rather than to the outside wheels as in a conventional suspension system thereby to counteract the jacking effect and enable the vehicle to negotiate a corner more safely and with better traction.

In a first particularized form of an independent type of suspension of the present invention, the tie assemblies include a generally triangularly-shaped tie structure that extends across the width of the body. The apex portion of the tie structure is pivotally interconnected to the lateral center of the body above the center of gravity of the body.

In another particularized form of an independent type of suspension of the present invention, the tie assemblies include a tie structure generally in the shape of an inverted tee that extends across the width of the body. The upper end of the central upright portion of the inverted tee-shaped tie structure is pivotally interconnected to the lateral center of the body above the center of gravity of the body.

In a further particularized form of an independent type of suspension of the present invention, the tie assemblies include a lower crossmember that extends across the body for interconnection with the arm assemblies. The lower ends of a pair of nominally diagonally disposed lower links are pivotally interconnected to spaced-apart locations along the crossmember. The upper end portions of these links extend toward each other and are pivotally connected to laterally spaced-apart locations of the body. The theoretical lines extending along the lower links intersect each other at a location above the center of gravity of the body whereby the links effectively interconnect the tie assembly to the body at a location above the center of gravity of the body.

In another particular aspect of the present invention the outer ends of the tie assemblies are pivotally connected to the lower ends of upright members rather than directly to the arm assemblies. The first end portions of a pair of upper and lower arm assemblies are pivotally connected to the wheel-mounting members, and second end portions of the arm assemblies pivotally connected to the upright members. In addition, the outer end portions of a pair of upper, transverse links are pivotally connected to the upper portions of the upright members while the inward end portions of the upper links are pivotally connected to the body at locations spaced above the roll axis (roll center). By this construction of the suspension system, the body tilts inwardly as the vehicle rounds a curve, thereby placing a downward compressing force on inside spring assemblies which in turn causes an increased downward load on the inside wheels. Also during cornering, the tie assemblies pivot about the reaction center tending to raise the inside (relative to the center of the corner about which the vehicle is traveling) upright members and lower the outside upright members, while simultaneously the upper transverse links shift a slight distance laterally inwardly relative to the suspension system, the combined effect of which is to tilt the upright members inwardly into the curve which in turn tilts the wheel-mounting members and their associated wheels in the same direction. As a consequence, camber thrust is produced tending to thrust the wheels toward the center of the corner around which the vehicle is being driven thereby counteracting the centrifugal forces acting outwardly on the wheels.

A second generalized form of the present invention concerns a solid axle-type of suspension system wherein the wheels or other type of vehicle support members are mounted on the ends of a solid axle. The lower ends of the spring assemblies are mounted on outer portions of the axle and the upper ends of the spring assemblies are secured to overhead portions of the body, thereby to carry the weight of the body through the spring assemblies directly on the axle. The upper portion of a tie assembly is pivotally connected to the body about a roll axis located at an elevation above the center of gravity of the vehicle. The lower portion of the tie assembly is pivotally connected to the axle so that the axle and body are free to move vertically relative to each other, such as when the wheels travel over bumps or depressions in the road. As a result of this construction, the centrifugal force acting on the body during cornering tilts the body toward the center of the curve, thereby exerting a compression force on the spring assembly located at the side of the vehicle toward the center of the curve. In addition, the roll axis shifts laterally outwardly relative to the vehicle wheels in the direction away from the center of the corner so that the roll axis does not function as the reaction center of the vehicle.

In a first particularized form of a solid axle type of suspension system of the present invention, the lower portion of a tie assembly extends laterally across the body. The outer ends of the tie assembly are pivotally connected with the ends of longitudinally disposed arm assemblies. The opposite ends of the arm assemblies are pivotally interconnected to outward portions of the solid axle. The arm assemblies enable the axle to move vertically relative to the body.

In a second particularized form of a solid axle type of suspension system of the present invention, the tie assembly includes a nominally upright tie structure that extends downwardly from its interconnection point with the body to engage over a roller pivotally mounted on the axle. The roller bears against side portions of the tie structure to laterally restrain the tie structure while permitting the tie structure to move vertically relative to the axle in response to the movement of the body.

BRIEF DESCRIPTION OF THE DRAWINGS

The details of typical embodiments of the present invention will be described in connection with the accompanying drawings, in which.

DETAILED DESCRIPTION

Referring initially to FIGS. 1-4, a vehicle 12a having body 14 is shown as mounted on a suspension system 16a of the present invention which in turn is supported on forward wheels 18 and rear wheels 19. As used in the present invention, the term "body" is intended to include a relatively rigid structure comprising a chassis, frame, the body thereof, and any additional supports and members rigidly attached thereto for accommodating the suspension system of the present invention. The body has a forward portion 14a and a rearward portion 14b. The body may be constructed with a conventional body and an underlying chassis, may be in the form of a unibody constructed with an integral chassis, or may be constructed in other manners without departing from the spirit or scope of the present invention.

Figure 1:
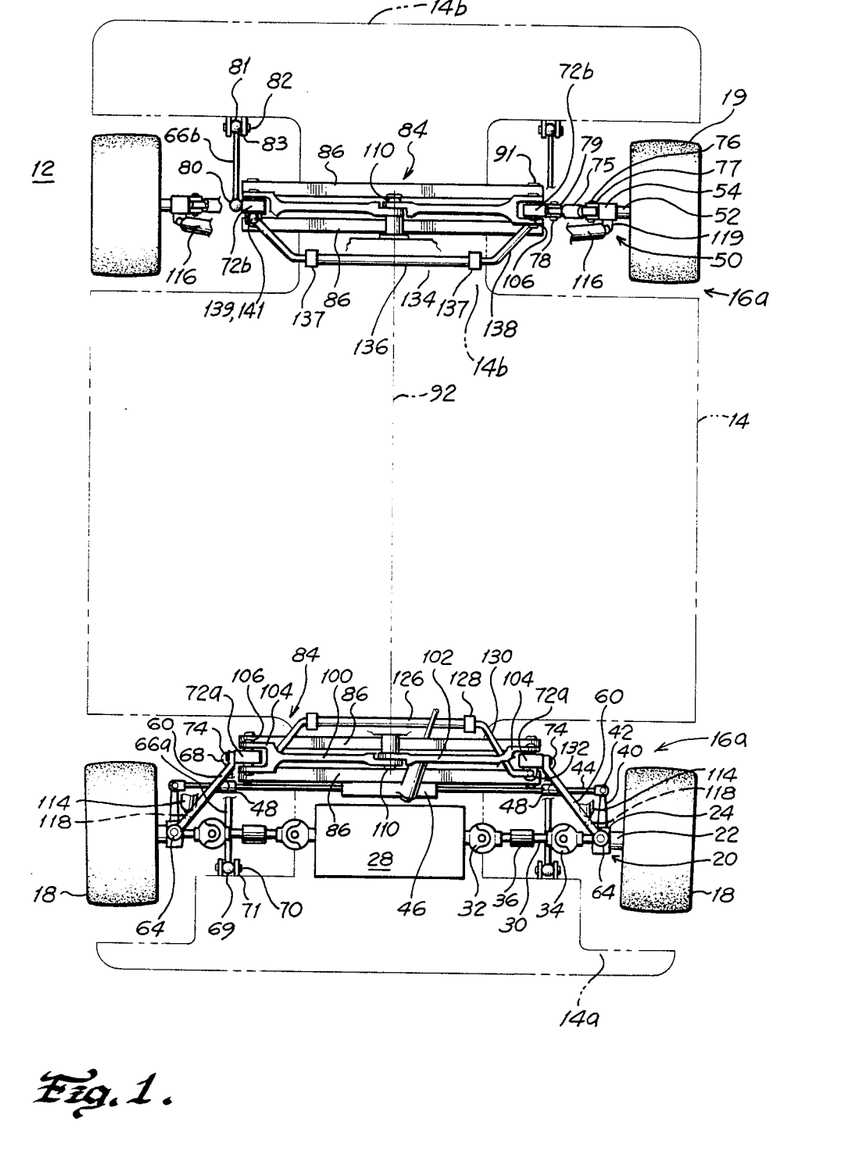
FIG. 1 is a fragmentary, partially schematic top view of a vehicle suspension system constructed according to the present invention.
Figure 2:
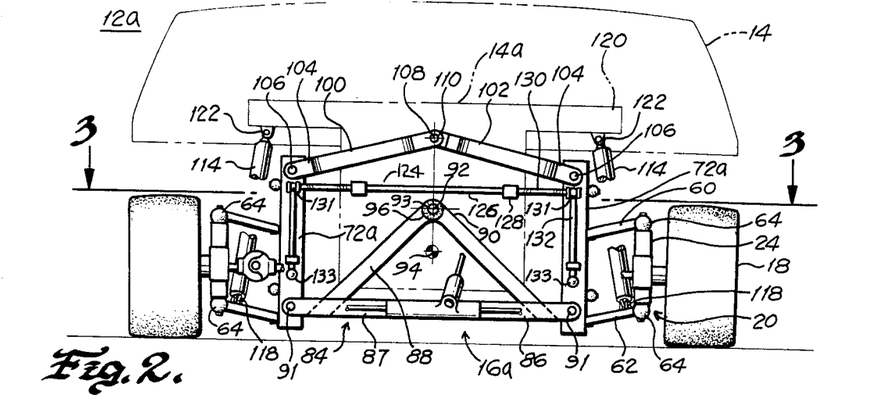
FIG. 2 is a fragmentary, partially schematic front elevational view of the suspension system illustrated in FIG. 1, with certain components removed for clarity.
Figure 3:
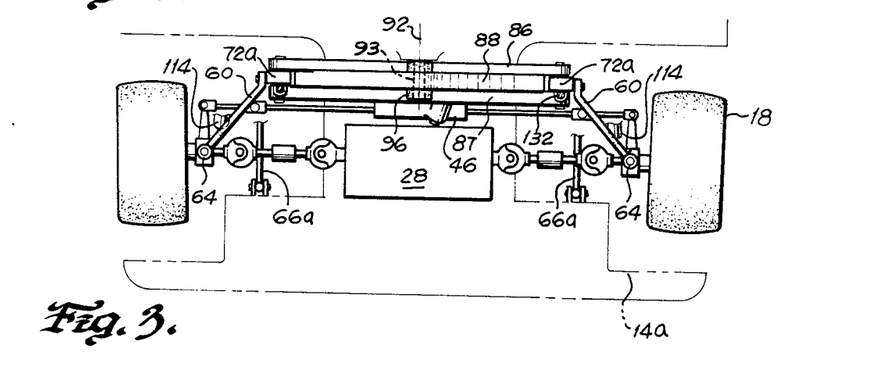
FIG. 3 is a fragmentary, partially schematic cross-sectional view of the suspension system illustrated in FIGS. 1 and 2 taken substantially along section lines 3—3 of FIG. 2.
Figure 4:
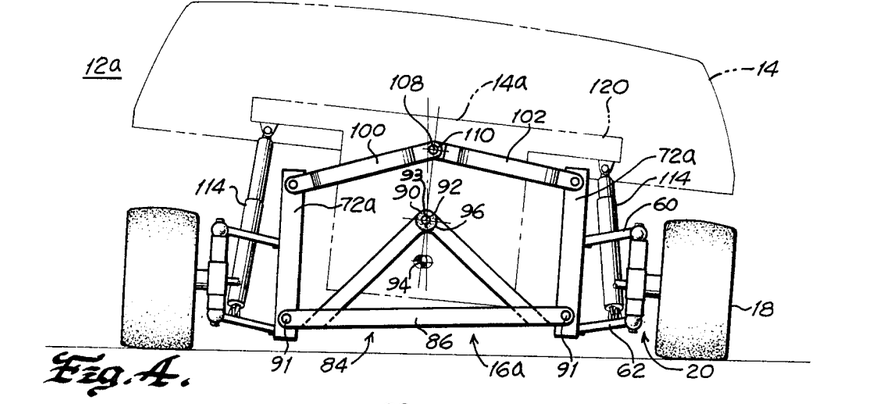
FIG. 4 is a view similar to FIG. 2, but illustrating the tilt of the vehicle body, the dynamic camber of the wheels and the shift of the suspension system when the vehicle was subjected to lateral loads, such as during cornering.

At the front of the vehicle, as shown in FIGS. 2, 3 and 4, and the lower portion of FIG. 1, vehicle 12a is supported by forward wheels 18 mounted on suitable wheel-mounting members 20 having steerable outer drive shaft sections in the form of stub axles 22 journalled within upright axle carriers 24. Stub axles 22 are driven by engine 28 through drive shaft 30 and a suitable transmission or other drive means (not shown). As shown in FIG. 1, the ends of drive shafts 30 are provided with universal joints 32 and 34 to permit independent vertical and other directional movement of front wheels 18 while still providing positive drive to the wheels. Each drive shaft 30 is constructed with an integral coupling assembly 36 that permits relative movement of universal joints 32 and 34 along the length of the drive shafts while transmitting torque through the drive shafts. Such coupling assemblies are well known in the art and are articles of commerce. The same is true for universal joints 32 and 34. As discussed more fully below, this permits relative swinging movement of body 14, together with engine 28, relative to suspension system 16a during cornering of vehicle 12a. Rather than existing as individual components, coupling assemblies functioning similar to couple assemblies 36 can be constructed as an integral portion of universal joints 32 and 34, as is well known in the art.

Continuing to refer specifically to FIG. 1, steering arms 40 extend rearwardly from each axle carrier 24 to carry a ball-type joint 42 to which the outer ends of transverse steering rod assemblies 44 are interconnected. Steering rod assemblies 44 extend outwardly from a rack-and-pinion assembly 46 mounted on suspension system 16a of the present invention. Each end of the steering rack assembly 46 includes a ball joint 48 to permit the steering rod assembly 44 to pivot in response to the up-and-down movement of the front wheels relative to suspension system 16a.

At the rear of vehicle 12, as shown in the upper portion of FIG. 1, rear wheels 19 are journalled on wheel-mounting members 50 composed of stub axles 52 carried by generally upright axle carriers 54. With the specific exceptions noted below, ideally, the remainder of the forward and rearward portions of suspension system 16a are constructed substantially similarly, and thus, the same reference numbers will be used for corresponding components of the suspension system.

As shown in FIGS. 1-4, upper and lower trailing arms 60 and 62 are employed to interconnect axle carriers 24 with rearwardly and inwardly located forward upright members 72a. The longitudinally disposed, forward end portions of the trailing arms 60 and 62 are attached to the upper and lower ends of axle carriers 24 by ball joints 64, or other suitable means. From their forward end portions, the trailing arms 60 and 62 extend rearward and diagonally inwardly to terminate at longitudinally disposed, rearwardly extending terminal portions that are pinned to intermediate and lower portions of corresponding forward upright members 72a through the use of transverse stub shafts 74 or other suitable means extending laterally outwardly from the upright members 72a. It will be appreciated that the use of trailing arms 60 and 62, ball joints 64 and transverse stub shafts 74 enable axle carriers 24 and their corresponding wheels 18 to move vertically relative to upright members 72a, for instance, in response to bumps or depressions in the road, while constraining the axle carriers and the upright members to tilt cooperatively laterally together as the vehicle negotiates a corner, as more fully described below.

As illustrated in FIGS. 1-4, pairs of vertically spaced apart rods 66a extend longitudinally forward from intermediate elevations of forward upright members 72a to interconnect with body forward portion 14a thereby to restrain the upright members from tilting in the fore-and-aft direction. Ideally, ball joints 68 are used to attach the rear ends of rods 66a to the upright members while ball joints 69 and transverse pins 70 are employed at the front of the rods. Pins 70 extend through aligned openings formed in mounting ears 71 extending rearwardly from body forward portion 14a. It will be appreciated that by this construction, rods 66a function as components of a four-bar linkage arrangement to constrain upright members 72a against shifting or tilting in the fore-and-aft direction, such as during acceleration or braking, while permitting the upright members to tilt laterally, such as during cornering, as described more fully below.

At the rear of vehicle 12a, a pair of vertically spaced apart upper and lower transverse arms 75 (only the upper arms are shown) are pinned to the upper and lower portions of axle carriers 54 by pivot pins 76 that engage through aligned openings formed in spaced-apart upper and lower pairs of mounting ears 77 that project inwardly from the axle carriers. The inward ends of the transverse arms 75 are pinned to intermediate and lower portions of rear upright members 72b through the use of pivot pins 78 that engage through aligned openings formed in spaced apart upper and lower pairs of mounting ears 79 that project laterally outwardly from the upright members. It will be appreciated that in a manner similar to front wheels 18, by the use of axle carriers 54, transverse upper and lower arms 75 and rear upright members 72b, the rear wheels 19 are independently suspended on vehicle 12a.

As shown best in FIG. 1, pairs of vertically spaced apart rods 66b (only the upper rods are shown) extend longitudinally rearward from intermediate elevations of rear upright members 72b to interconnect with body rearward portion 14b. Ideally, ball joints 80 are employed to attach the forward ends of rods 66b to the upright members while ball joints 81 together with transverse pins 82 are used to attach the rear ends of the rods to body portion 14b. Pins 82 extend through aligned openings formed in mounting ears 83 extending forwardly from body rearward portion 14b. It will be appreciated that in a manner similar to forward rods 66a, rods 66b function as components of a four-bar linkage arrangement to constrain upright members 72b against shifting or tilting in the fore and aft direction, for instance, during acceleration or braking, while permitting the upright members to tilt laterally, such as during cornering, as described more fully below.

It is to be understood that upper and lower transverse arms 75 at the rear of vehicle 12a may be replaced with trailing arms, not shown, similar to arms 60 employed at the front of vehicle 12a. It is to be further understood that such modifications of suspension system 16a not depart from the spirit or scope of the present invention.

Suspension system 16a of the present invention also includes tie assemblies 84 in the form of triangular tie structures 86 spanning across the adjacent forward and rearward portions 14a and 14b of body 14 between upright members 72a and 72b, respectively. As shown most clearly in FIG. 3, preferably the triangular structures are composed of a pair of crossbeams 87 disposed in spaced apart relationship to each other by diagonal members 88 having their lower, outer ends sandwiched between and fixedly secured to the crossbeams. The upward, inward ends of diagonal members 88 intersect each other to form the apex portion 90 of the triangular structures. Diagonal members 88 position the two crossbeams 87 apart from each other at the proper distance so that the outer end portions of the beams closely receive upright members 72a or 72b between them.

The outer end portions of crossbeams 87 are pinned to the lower portions of upright members 72a or 72b by pins 91, or other appropriate hardware disposed in the fore and aft direction. The upper apex portion 90 of triangular structures 86 are pivotally connected to body portions 14a and 14b about a longitudinal axis (roll axis) 92 located above the center of gravity 94 of body 14. Axis 92 functions as the roll center of body 14, i.e., the axis above which the body pivots when cornering. Ideally, axis 92 is located at the lateral center of body 14.

A stub shaft 93 or other similar member may be mounted on body portions 14a and 14b at roll axis 92 to engage with a close fitting opening formed in apex portion 90. Preferably, rubber or other elastic-type bushing 96 is interposed between stub shaft 93 and the opening formed in apex 90 to accommodate a certain amount of racking of the tie structures relative to the body caused by the retention of tie assemblies 84 by rods 66a and 66b. As the tie assemblies pivot about axis 92, the rods 66a and 66b swing about their mounting points to either push against or pull on the corresponding upright member 72a or 72b thereby causing the adjacent portion of tie assembly to move slightly in the fore-and-aft direction.

It is to be understood that rather than being constructed in the manner described above, triangular tie structures 86 can be constructed in other manners without departing from the spirit or scope of the present invention. For instance, the tie structures can be constructed from three tubular or solid elements welded or otherwise fastened together to achieve the desired shape of the tie structures or from a single member that is forged or otherwise manufactured.

Suspension system 16a of the present invention also includes a pair of transverse, upper link members 100 and 102 having outer end portions shaped in the form of a clevis 104 that is rotatably secured to the upper end portions of upright members 72a and 72b through the use of pivot pins 106 disposed in the fore and aft direction in alignment with tie assembly 91. The inward ends of upper link members 100 and 102 are cojointly pivotally secured to body forward and rearward portions 14a and 14b about an axis 108 located along the lateral center of the body and above roll axis 92. The interconnection between the inward ends of the upper link members and the body portions may be accomplished through the use of stub shafts 110 or other appropriate means. Ideally, axis 108 is positioned above pivot pins 106 so that upper link members 100 and 102 extend diagonally upwardly in the inward direction.

Suspension system 16a of the present invention further employs forward and rearward spring assemblies 114 and 116 to carry the weight of body 14. The spring assemblies ideally are constructed in the form of combination shock absorber/spring assemblies, both to carry the weight of body 14 and also to absorb shock loads imposed on wheels 18 and 19. The lower ends of spring assemblies 114 are pivotally secured to the lower trailing arms 60 at locations closely adjacent corresponding axle carriers 24 through the use of appropriate mounting brackets 118. The lower ends of spring assemblies 116 are pivotally secured to the lower portions of axle carrier 54 with appropriate mounting brackets 119. The opposite or upper ends of spring assemblies 114 and 116 are secured to overhead sections 120 of body portions 14a and 14b by appropriate bracket assemblies 122 depending downwardly therefrom. It will be appreciated that when body 14 tilts about its roll center 92, the right or left spring assemblies 114 and 116 corresponding to the direction of tilt of the body are compressed, thereby increasing the downward load on the adjacent wheels.

Next, describing the operation of suspension system 16a when vehicle 12a negotiates a turn, the centrifugal force imposed on body 14 acts at the center of gravity 94 of the body which, as shown in FIG. 4, tilts the body about its roll center, axis 92, thereby causing the body to tilt inwardly about the roll center, i.e., in the direction towards the center of the curve along which the vehicle is traveling (toward the right in FIG. 4). The resulting outward lateral movement of the center of gravity (toward the left) is shown in FIG. 4. Because the body is tilted, the driver and passenger are forced downwardly into their seats rather than sideways as in a conventional vehicle, thereby improving the driver and passenger comfort over conventional vehicles.

In addition, axis 108 of upper link members 100 and 102 is shifted toward the inside of the curve relative to the roll center as the body 14 tilts inwardly during cornering. At the same time, the triangular tie structure 86 pivots about the lateral center of crossbeams 87 causing the inside upright members 72a and 72b to rise upwardly and the outside members 72a and 72b to lower downwardly. The combined effect of these movements, as shown in FIG. 4, is to cause upright members 72a and 72b to pivot relative to pins 91 and 106 to tilt the upright members toward the inside of the curve. This in turn causes the corresponding tilting of axle carriers 24 and 54, thereby altering the camber of wheels 18 and 19, by causing the wheels also to tilt toward the inside of the curve. As discussed above, this results in better traction between the wheels and the road surface by producing a thrust force acting on the wheels at the contact point between the wheels and ground, in the direction toward the inside of the curve. This inward acting camber thrust counteracts, to a certain extent, the thrust force acting in the opposite direction on the wheels due to the centrifugal force on acting on the vehicle.

The inward tilting of the body also imposes a compressive force on the inside spring assemblies 114 and 116 which in turn imparts a downward load on adjacent inside wheels 18 and 19, as opposed to a typical automotive vehicle wherein an increased downward force is imposed on the outer wheels. The increased loading on the inside wheels assist in counteracting the jacking effect on the vehicle. This improves the traction of the vehicle when cornering, thereby enabling the vehicle to negotiate turns not only more rapidly, but also more safely.

Also, during cornering, the centrifugal forces acting on body 14 and suspension system 16a cause the roll center 92 to shift laterally outwardly. This lateral movement of the roll center prevents it from acting as the reaction center, i.e., the elevational point through which the lateral forces act to cause the jacking effect that tends to raise the inside wheels and roll the vehicle about its outside wheels. During the time period in which the sideways movement of the roll center is taking place, the lateral forces are being expended to compress spring assemblies 114, thereby shifting and tilting the suspension system 16a and body 14 in the manner described above, rather than acting to impose a high jacking effect on the vehicle. As a result, the effective reaction center of the vehicle is at an elevation below roll center 92, thus resulting in a relatively low jacking effect being imposed on vehicle 12a.

In the embodiment of the present invention illustrated in FIGS. 1–4, it may be desirable to provide some means for restraining the tilting of body 14 relative to suspension system 16a while cornering. To a certain extent, this can be accomplished by the selective positioning of body roll center 92 relative to the center by gravity 94 of the body and by the spring rate of spring assemblies 114 and 116. In addition, an antiroll device, such as forward antiroll bar 124 may be utilized. As shown in FIGS. 1 and 2, forward antiroll bar 124 includes a central portion 126 attached to the outward edge portions of body forward portion 14a by appropriate sleeve-type bracket assemblies 128. Diagonal portions 130 extend laterally outwardly from central portion 126 to the forward sides of upright members 72a to engage with ball joints 131 mounted on the upper end portions of vertical leg members 132 that extend downwardly along the forward faces of the upright members. The bottom of antiroll bar leg members 132 are anchored to the lower portions of upright members 72a by the use of ball joints 133. Alternatively, the lower ends of leg members 132 can be secured to pins 91 by any suitable securing means, in a manner well known in the art. Also, rather than extending downwardly along the front faces of upright members 72a, leg members can be positioned on the rear sides of the upright members, with the diagonal portions 130 of the antiroll accordingly modified.

The relative tilting movement between body 14 and suspension system 16 causes flexure of antiroll bar 124 which tends to limit such relative tilting movement. It will be appreciated that antiroll bar 124 does not, however, affect the operation or spring rate of spring assemblies 114 which are free to compress and expand in response to the up and down movement of wheels 18. In a conventional vehicle, a typical antiroll bar is interconnected to the suspension system in such a manner that the roll bar tends to counteract the operation of the road springs. This limitation does not exist in the present invention. As a consequence, spring rates employed in spring assemblies 114 can be chosen for the desired firmness or softness of ride without having to take into consideration the effect of antiroll bar 124. For instance, the spring rates of springs 114 can be chosen to result in a "soft" ride thereby isolating the body 14 and the passengers from the up-and-down movement of the wheels. In a conventional vehicle, this soft ride would be lost whenever the antiroll bar comes into play, i.e., when negotiating a corner. This limitation does not exist in the present invention.

As shown in FIG. 1, at the rear of vehicle 12a a rear antiroll bar 134, similar to front antiroll bar 124, is employed. The rear antiroll bar is constructed with a center portion 136 that is mounted on body rearward portion 14b by appropriate sleeve-type bracket assemblies 137. The rear roll bar also includes diagonal portions 138 extending to the forward sides of rear upright members 72b to engage with ball joints 139 mounted on the upper end portions of vertical leg members 140 extending downwardly along the forward faces of the rear upright members in a manner similar to the vertical leg members 132 of forward antiroll bar 124. The lower ends of vertical leg members 140 are secured to the lower portions of rear upright members 72b by the use of ball joints 141. Alternatively, the lower ends of leg members 140 can be secured to pins 91 by any appropriate means, as is well known in the art. It will be appreciated that rear antiroll bar 134 operates in a manner similar to and provides the same advantages of forward antiroll bar 124, discussed above.

Figure 5:
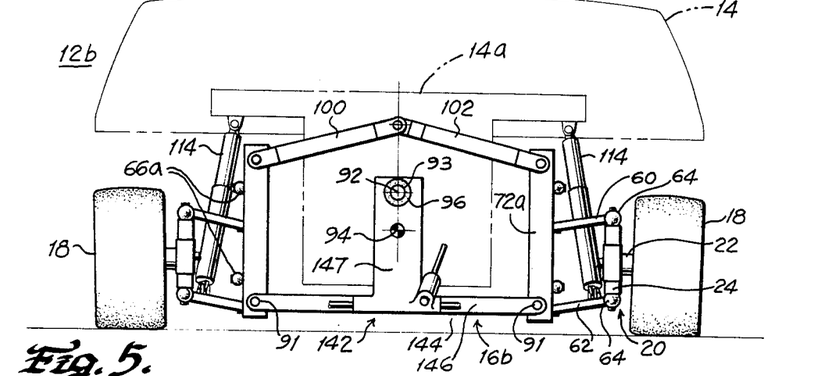
FIG. 5 is a fragmentary, partially schematic front elevational view of another embodiment of the present invention.

FIG. 5 illustrates an alternative preferred embodiment of the present invention wherein a suspension system 16b of a vehicle 12b is constructed with a tie assembly 142 having inverted tee-shaped tie structures 144 as opposed to triangular-shaped tie structures 86 shown in FIGS. 1–4. The Tee-shaped tie structures 144 include a lower transverse portion 146 having its outer ends pivotally pinned to the lower ends of upright members 72a and 72b in the manner of tie structures 86. The Tee-shaped tie structures also include central upwardly extending portions 147 pivotally connected to body forward and rearward end portions 14a and 14b at body roll center 92 in the manner of the apex portions 90 of tie structures 86. A stub shaft 93 or other similar member is mounted on body portions 14a and 14b at roll axis 92 to extend through an opening extending through upwardly extending portion 147. A rubber or other elastic-type bushing 96 is interposed between stub shaft 93 and the opening formed in upwardly extending portion 147 to accommodate a certain amount of racking between tie structures 144 and body end portions 14a and 14b.

With the exception of the above-described differences in construction between tie assemblies 142 and 84, suspension system 16b is constructed substantially identically to suspension system 16a, and thus, the remainder of the construction of suspension system 16b will not be repeated here. In addition, in operation, suspension system 16b is essentially identical with suspension system 16a, and thus also will not be repeated here.

Figure 6:
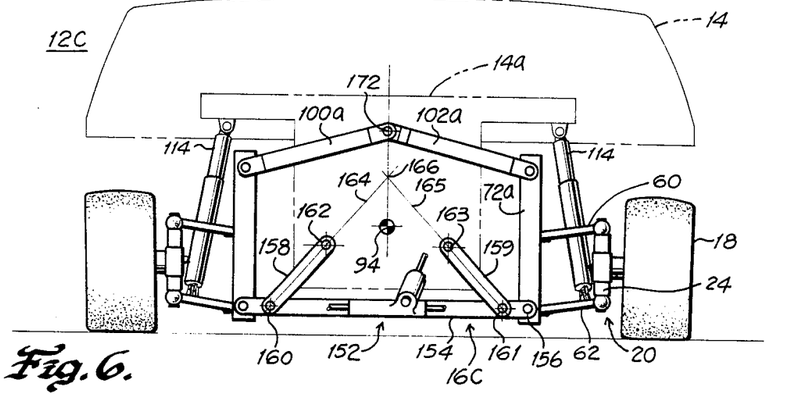
FIG. 6 is a fragmentary, partially schematic front elevational view of a further embodiment of a suspension system constructed according to the present invention.

FIG. 6 illustrates a further preferred embodiment of the present invention wherein a suspension system 16c for a vehicle 12c employs a tie assembly 152 constructed somewhat differently than the tie assemblies 84 and 142 illustrated in FIGS. 1–5. Tie assembly 152 is constructed with transverse cross members 154 extending laterally across body forward and rearward end portions 14a and 14b to overlap the front and rear surfaces of upright members 72a and 72b. The outer ends of the crossmembers are pinned to the lower end portion of the upright members with pins 156 disposed in the fore and aft direction in the manner of pins 91 shown in FIGS. 1–5. Tie assembly 152 also includes a pair of nominally diagonally disposed lower links 158 and 159 having their lower, outer ends pivotally pinned at spaced-apart locations 160 and 161 to crossmembers 154 and their upper, inward ends pinned at laterally spaced-apart locations 162 and 163 to body forward and rear end portions 14a and 14b. As shown in FIG. 6, lower links 158 and 159 are nominally diagonally oriented so that lower link lines 164 and 165, representing extensions of lower links 158 and 159, respectively, intersect each other at intersection point 166 located above center of gravity 94 of body 14. Ideally, intersection point 166 is located at the lateral center of body 14, i.e., directly above body center of gravity 94.

Suspension system 16c also employs upper link members 100a and 102a, the outer ends of which are pinned to the upper ends of upright members 72a and 72b. The inward ends of link members are pinned to body forward and rear end porions at a location 172 spaced above roll center 166 in the manner of upper links 100 and 102 shown in FIGS. 1–5.

When vehicle 12c is being driven through a turn, body 14 pivots about the intersection point 166 of link lines 164 and 165, which intersection point corresponds to the roll center of the body. As such, body 14 tilts inwardly into the curve in the same manner as the prior forms of the present invention shown in FIGS. 1–5. As the body tilts inwardly into the curve, the inside spring assemblies 114 and 116 are compressed, thereby exerting a downward load on the adjacent axle carriers 24 and 54. As a result, an increased downward load is imposed on the inside wheels 18 and 19. In addition, when the body tilts into the corner, upper links 100a and 102a are forced toward the inside of the corner (to the right in FIG. 6) thereby tilting members 72a and 72b in the same direction. As discussed above, relative to suspension systems 16a and 16b, this causes the wheels 18 and 19 to tilt accordingly, thereby producing an inwardly acting camber thrust, as discussed above.

Other than with the above-described differences, the construction and operation of suspension system 16c is substantially identical to suspension systems 16a and 16b, described above. As a result, suspension system 16c provides the same advantages over conventional suspension systems as provided by suspension systems 16a and 16b. Accordingly, these additional aspects of suspension system 16c will not be repeated here. It is to be appreciated that suspension system 16c intrudes less into the interior of the vehicle envelope than suspension systems 16a or 16b, which may be advantageous for certain types of vehicles, such as station wagons and vans.

Figure 7:
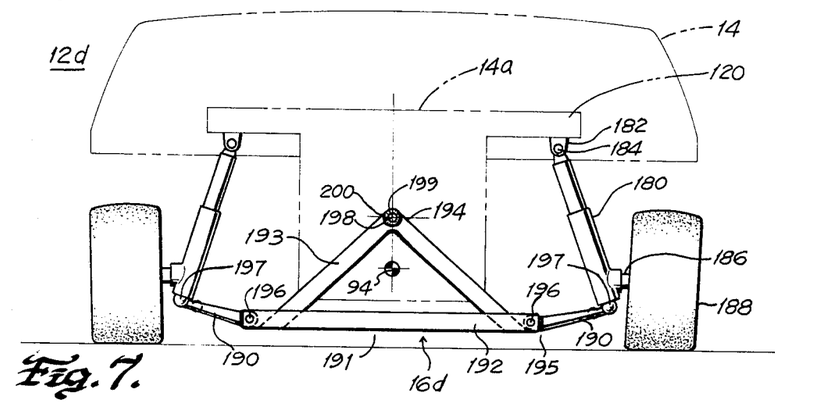
FIG. 7 is a fragmentary, partially schematic front elevational view of an additional embodiment of a suspension system constructed according to the present invention.
Figure 8:
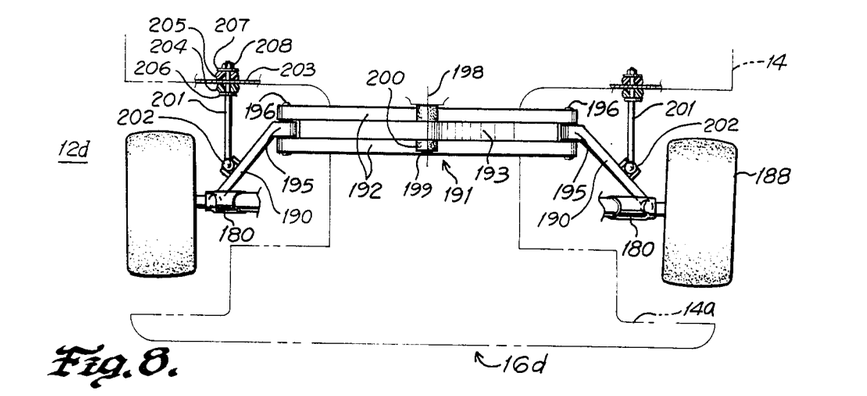
FIG. 8 is a fragmentary, partially schematic top view of the suspension system shown in FIG. 7.

FIGS. 7 and 8 illustrate a further preferred embodiment of the present invention wherein a vehicle 12d includes a suspension system 16d composed of combination spring/shock absorber assemblies 180 for supporting vehicle body 14. The upper ends of the spring/shock absorber assemblies are secured to overhead portions 120 of the body by appropriate brackets 182. Longitudinally disposed crosspins 184 pivotally pin the upper end portions of the spring/shock absorber assemblies to brackets 182. Stub axles 186, on which wheels 188 are mounted, are journalled directly to the lower end portion of spring/shock absorber assemblies 180 to be carried thereby. Spring/shock absorber assemblies such as those constructed similarly to assemblies 180 are well known in the art and are commonly referred to as McPherson Struts. McPherson Struts are commonly used in conjunction with the front drive axles of front-wheel drive automobiles and also with the rear wheels of the vehicle.

A tie assembly interconnects the spring/shock absorber assemblies 180 with body 14. The tie assembly includes trailing arms 190 that extend rearwardly and diagonally inwardly from the lower end portion of spring/shock absorber assemblies 180 to pivotally interconnect with the outer end portions of a triangularly shaped tie structure 191. Tie structure 191 is preferably triangular in shape and constructed similarly to tie structures as shown in FIGS. 1-4. Tie structure 191 is composed of a pair of cross beams 192 disposed in spaced apart relationship to each other by diagonal members 193 having their lower, outer ends sandwiched between and fixedly secured to the crossbeams. The upward, inward ends of diagonal members 193 intersect each other to form an apex portion 194. Diagonal members 193 position the two crossbeams 192 apart from each other at the proper distance so that the outer end portions of the beams closely receive the rear, laterally disposed end portions 195 of trailing arms 190. A longitudinal cross pin 196 extends through aligned openings formed in the outer ends of crossbeams 192 and through a clearance hole formed in end portions 195 of trailing arms 190. The forward end portions of trailing arms 190 are attached to the lower ends of spring/shock absorber assemblies through the use of ball joints 197 mounted beneath the spring/shock absorber assemblies in a well-known manner.

Also, in the manner of tie structures 86, the apex portions 194 of tie structures 191 are pinned to body forward and rear portions 14a and 14b along a longitudinal axis 198 located above the center of gravity 94 of body 14, which axis serves as the roll center of body 14. A stub shaft or similar member 199 extends longitudinally from body portions 14a and 14b at axis 198 to engage with a rubber bushing 200 mounted on the apex portion 194 of tie structure 192. It will be appreciated that other types of multidirectional, conventional connectors may be used in place of rubber bushing 200, such as a ball-type joint, not shown.

As most clearly shown in FIG. 8, restraining struts 201 extend rearwardly from the lower portions spring/shock absorber assemblies 180 to interconnect with body 14. Ideally, the forward ends of restraining struts 201 are connected to trailing arms 190 at locations closely adjacent corresponding spring/shock absorber assemblies 180 by ball joints 202 or other appropriate connection devices to enable relative angular movement between these two. Also, preferably the rearward ends of the restraining struts extend through an opening formed in body wall 203. Rubber doughnut-type washers 204 and 205 are disposed on opposite sides of body wall 203. A metal washer 206 that abuts against a shoulder formed in strut 201 bears against the opposite side of rubber washer 204, and a metal washer 207 bears against the opposite side of rubber washers 205. A nut 208 threadably engages with the end of strut 201 to compress rubber washers 204 and 205 against body wall 203 in a well-known manner in the art. It will be appreciated that struts 201 permit substantially free relative movement between the tie assembly and body 14 except in the fore-and-aft direction. This is especially important during acceleration and braking, at which times body 14 seeks to shift longitudinally relative to suspension system 16d. It will be appreciated that rather than being interconnected to arm 190, the forward end of struts 201 can instead be secured to tie structure 191.

The suspension system shown 16d in FIGS. 7 and 8 operates similarly to the suspension systems 16a, 16b and 16c depicted in FIGS. 1-5, in that when the vehicle 12d is rounding a turn, the lateral forces that act through the center of gravity 94 of body 14 cause the body to pivot about roll axis 198, thereby tilting the body toward the inside of the curve. The tilted body, acting through corresponding spring/shock absorber assemblies 180, imposes an increased downward load on the corresponding inside tires 188, thereby not only improving the traction and stability of vehicle 12d, but also reducing the jacking effect on the vehicle.

It is to be understood that the embodiment of the present invention illustrated in FIGS. 7 and 8 may be modified to employ tie assemblies similar to tie assemblies 142 and 152 illustrated in FIGS. 5 and 6. With such modifications, the resulting suspension systems would function and provide the same advantages as provided by suspension system 16d.

Figure 9:
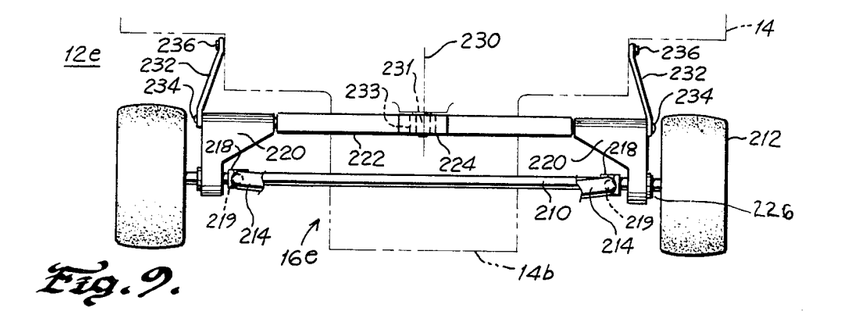
FIG. 9 is a fragmentary, partially schematic top view of the rear portion of another suspension system constructed according to the present invention.
Figure 10:
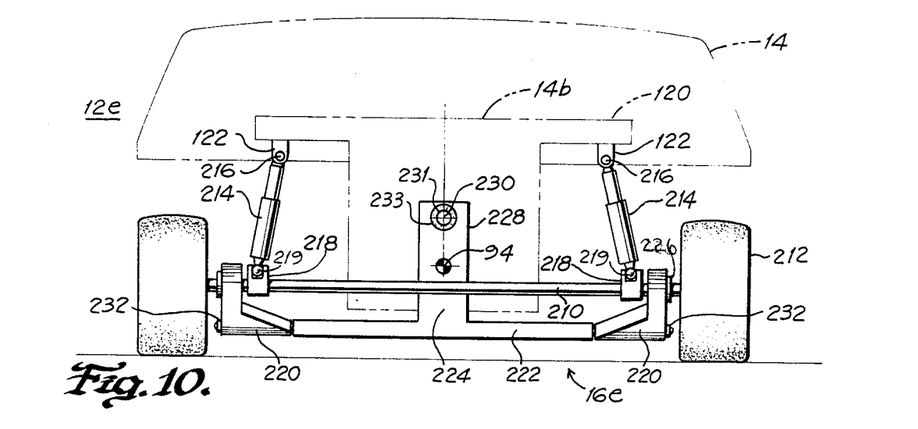
FIG. 10 is a rear elevational view of the suspension system shown in FIG. 9; and, FIG. 11 is a fragmentary, partially schematic rear elevational view of a further embodiment of a suspension system constructed according to the present invention.

FIGS. 9 and 10 illustrate a further preferred embodiment of the present invention wherein a suspension system 16e is employed in conjunction with a vehicle 12e constructed with a solid axle 210, as is often employed in the rear suspension of a front-wheel drive vehicle. Wheels 212 are mounted on the outward ends of solid axle 210 in a conventional, well known manner. The weight of body 14 is carried by spring assemblies 214 in the form of combination shock absorber/spring assemblies. In addition to carrying the weight of the body the spring assemblies 214 also absorb shock loads imposed on wheels 212. The upper ends of the spring assemblies 214 are secured to overhead sections 120 of body rear portion 14b by appropriate bracket assemblies 122 depending downwardly therefrom. A ball joint, pin, or similar type of interconnection 216 may be employed to attach the upper ends of spring assemblies 214 to brackets 122, in a manner well known in the art. The lower ends of spring assemblies 214 are pivotally secured to the outer end portions of axle 210 by brackets 218. As at the upper ends of spring assemblies 214, appropriate ball joints, pins, or other connection devices 219 are employed to interconnect the lower ends of the spring assemblies with brackets 218, in a manner well known in the art.

A tie assembly interconnects the body 14 to axle 210. The tie assembly includes triangularly shaped leading arms 220 extending forwardly from axle 210 to pivotally interconnect with the outer end portions of a lower transverse beam member 222 of a T-shaped tie structure 224. Ball joints 226, or similar connection members, are employed to attach arms 220 to the solid axle 210 to permit relative movement therebetween. The opposite ends of arms 220 are designed to engage over the outer end portions of beam member 222 thereby to permit the arms to pivot relative to the beam member. Appropriate bearings and bushings, not shown, may be employed to antifrictionally interconnect arms 220 with beam member 222, in a manner well known in the art. The arms enable the axle to move vertically relative to body 14 and also permit the ends of the beam member 222 to move, to a certain extent, vertically relative to each other.

Tie structure 224 also includes a central upwardly extending portion 228 that is pivotally attached to body rearward portion 14b at body roll center 230 in a manner similar to the attachment of T-shaped tie structure 144 to body 14, as illustrated in FIG. 5. As shown in FIG. 10, roll center 230 is located above the center of gravity 94 of body 14. A stub shaft 231 or similar member is mounted on body portion 14b at roll center 230 to extend through an opening formed in upwardly extending portion 228. A rubber or elastic-type of bushing 233 is interposed between the stub shaft and the opening to accommodate a certain amount of racking between tie structure 224 and body portion 14b.

Referring specifically to FIG. 9, restraining struts 232 extend rearwardly from the outer ends of beam member 222 to interconnect with body 14. Ideally, the forward and rearward ends of restraining struts 232 are connected to beam members 222 and to body 14 through the use of ball joints 234 and 236 thereby enabling relative movement between tie structure 224 and body 14 except in the direction towards and away from each other. This is especially important during acceleration or braking, at which times body 14 seeks to shift longitudinally relative to suspension system 16e.

It will be appreciated that by constructing suspension system 16e in the manner set forth above and by attaching tie structure 224 to body 14 at axis 230 located above body roll center 94, suspension system 16e functions similarly to suspension 16a-16d, discussed above. As such, when vehicle 12e rounds a corner, the centrifugal force acting through the vehicle center of gravity 94 causes body 14 to tilt inwardly, i.e., toward the center of the curve about which the vehicle is being driven. When this occurs, the inward spring assembly 214 is compressed, thereby placing an increased downward load on the inside wheel 212 to improve the traction of the wheel and counteract the jacking effect on the vehicle.

It is to be understood that tie structure 224 may be replaced with a tie structure of a different shape, such as a triangular tie structure similar to tie structure 86 illustrated in FIGS. 1 through 4 or crossmember 154 and lower links 158 and 159 illustrated in FIG. 6, without departing from the spirit or scope of the present invention.

Figure 11:
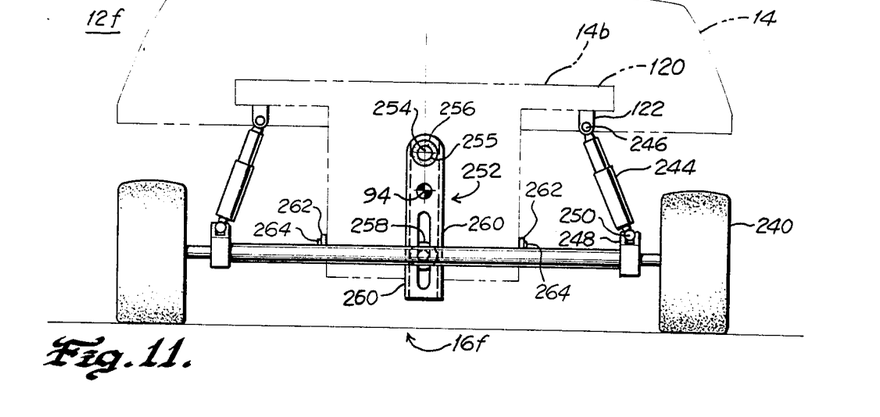

FIG. 11 illustrates another preferred embodiment of the present invention employed in conjunction with a suspension system 16f constructed with a solid axle. As shown in FIG. 11, wheels 240 are mounted on the outward ends of solid axle 242 in a conventional, well known manner. As in the previously described suspension systems 16a-16e, the weight of body 14 is carried by spring assemblies 244 which are constructed in the form of combination shock absorber/springs, both to carry the weight of the body and to absorb shock loads imposed on wheels 240. As in suspension system 16e, described above, the upper ends of spring assemblies 244 are secured to overhead sections 120 of body rear portion 14b by bracket assemblies 122 depending downwardly therefrom. A ball joint, pin or similar type of interconnection 246 is employed to secure the upper ends of spring assemblies to brackets 122 while allowing substantially universal movement between the spring assemblies and the brackets. The lower ends of spring assemblies 244 are pivotally secured to the outer end portions of axle 242 by brackets 248 fixedly secured to the axles. The lower ends of spring assemblies 244 are mounted on brackets 248 with ball joints 250 or other appropriate connection devices, as is well known in the art.

A tie assembly interconnects the body 14 to a central portion of axle 242. The tie assembly includes a nominally upright tie structure 252 having its upper end portion pivotally connected to body 14 at an axis 254 (roll center) located above a center of gravity 94 of body 14. A stub shaft 255 or similar member is mounted on body portion 14b at roll center 250 to extend through an opening formed in tie structure 252. An elastic bushing 256 composed of rubber or similar type of material is interposed between the stub shaft and the opening to accommodate a certain amount of racking between the tie structure and body portion 14b.

Preferably, tie structure 252 is constructed in the form of a channel member extending downwardly from roll center 254 to engage over a roller 258 rotatably mounted on axle 242 with a stub shaft, not shown, or other appropriate, well-known mounting structure. Also, bearings, not shown, or other well-known means may be employed to antifrictionally secure roller 258 to the stub shaft, now shown. Ideally, the diameter of roller 258 is devised to snugly engage against the inside surfaces of sidewalls 260 of tie structure 252 to restrain the portion of the tie structure adjacent the roller against lateral movement relative to the roller while enabling relative vertical movement between the tie structure and roller.

Restraining rods 262 similar to restraining struts 232, shown in FIGS. 9 and 10, extend generally longitudinally forwardly from spaced apart intermediate locations of axle 242 to interconnect with corresponding portions of body rearward to portion 14b. Ideally, the forward and rearward end portions of the restraining rods are interconnected with body rearward portion 14b and axle 242 with ball joints 264 or similar connection devices thereby permitting relative movement between the axle and body, such as in response to the up and down movement of wheels 240, while substantially preventing relative movement of the components in a longitudinal direction, especially during acceleration and braking.

It will be appreciated that by constructing suspension system 16f in the manner set forth above, as vehicle 12f rounds a corner, the centrifugal force acting through the vehicle center of gravity causes body 14 to pivot inwardly about roll center 254. When this occurs, the inward spring assembly 244 is compressed, thereby placing an increased downward load on the inside wheel 240 to improve the cornering ability of the vehicle.

It will be appreciated that by constructing tie structure 252 with a channel member that engages roller 258, relative upward and downward movement can occur between the tie structure and axle 242 thereby isolating body 14 from the vertical movement of the axle, such as when wheels 240 are subject to road vibrations.

Although the present invention has been illustrated and described in conjunction with vehicles 12a, 12b, 12c, 12d, 12e and 12f each mounted on wheels, it is to be understood that the present invention may be employed in conjunction with nonwheeled vehicles, such as snowmobiles supported by skiis, sleds supported by runners or other vehicles mounted on other types of support structures without departing from the spirit or scope of the present invention.

As will be apparent to those skilled in the art to which the invention is addressed, the present invention may be embodied in forms other than those specifically disclosed above without departing from the spirit or essential characteristics of the invention. The particular embodiments of the suspension systems 16a, 16b, 16c, 16d, 16e and 16f described above, are therefore to be considered in all respects as illustrative and not restrictive. The scope of the present invention is as set forth in the appended claims, rather than being limited to the examples of the suspension systems 16a, 16b, 16c, 16d, 16e and 16f, set forth in the foregoing description.

The embodiments of the invention in which an exclusive property or privilege is claimed are defined as follows:

1. A suspension system for a vehicle having a body, comprising:
    (A) vehicle support means on opposite sides of the body;
    (B) spring means to nominally carry substantially all of the weight of the body on said vehicle support means; and
    (C) tie assembly means interposed between said vehicle support means and the body, said tie assembly means having:
        first means for pivotally interconnecting said tie assembly means and the body about along a longitudinal roll axis disposed at an effective elevation above the reaction center whereby as the vehicle negotiates a curve, the resulting centrifugal force acting on the vehicle tilts the body toward the center of the curve relative to said tie assembly means and
        second means for interconnecting said tie assembly means to said vehicle support means to permit the roll axis defined by said first interconnection means to shift laterally outwardly relative to said vehicle support means in the direction away from the center of the curve that the vehicle is negotiating thereby precluding the roll axis from serving as the reaction center of the vehicle.

2. The suspension system according to claim 1, wherein:
    (A) said tie assembly means comprises a transverse tie structure extending laterally across the body;
    (B) said first interconnecting means pivotally interconnecting said tie structure to said body at an effective location above the reaction center; and
    (C) said second interconnecting means including arm assemblies pivotally interconnected at one end portion to said vehicle support means and at opposite end portions to outer end portions of said transverse tie structure.

3. The suspension system according to claim 2, wherein:
    (A) said tie structure being generally triangular in shape; and
    (B) said first interconnecting means interconnecting the upper apex portion of said triangularly shaped tie structure to the body at the lateral center of the body.

4. The suspension system according to claim 2, wherein:
    (A) said tie structure includes a lower crossmember extending across the body; and
    (B) said first interconnecting means includes a pair of nominally diagonally disposed links having first end portions pivotally connected to spaced-apart locations along said lower crossmember, and second upper end portions extending towards each other and pivotally connected to laterally spaced-apart locations of the body.

5. The suspension system according to claim 4, wherein lines extending along the lengths of said diagonal lower links intersect each other at a location above the reaction center.

6. The suspension system according to claim 2, wherein said arm assemblies extend generally longitudinally relative to the length of the vehicle.

7. The suspension system according to claim 2, further comprising:
    (A) upright members pivotally connected to outer end portions of said tie structures; and
    (B) a pair of transverse upper links having their outer end portions pivotally connected to said upright members at locations spaced above the outer end portions of said tie structures and having their inward end portions pivotally connected to the body at locations spaced above said first interconnection means for interconnecting said tie structures to the body.

8. The suspension system according to claim 7, wherein the inward ends of said upper links are conjointly connected together and to the body.

9. The suspension system according to claim 7, wherein said arm assemblies include a pair of vertically spaced-apart upper and lower arms extending between said vehicle support means and said upright members.

10. The suspension system according to claim 9, wherein said pairs of vertically spaced arms are trailing arms having their forward end portions pivotally connected to corresponding vehicle support means and having their rearward end portions pivotally connected to corresponding upright members.

11. The suspension system according to claim 9, wherein said spring means have lower end portions that are pivotally attached to said lower arm means at locations closely adjacent said vehicle support means and upper end portions connected to the body.

12. The suspension system according to claim 1, further comprising antiroll means to limit the tilt of the body relative to said tie assembly means.

13. The suspension system according to claim 1, wherein said vehicle support means includes a wheel-mounting member having wheel-mounting axle means thereon.

14. The suspension system according to claim 13, wherein said spring means being mounted closely adjacent said wheel-mounting members and interconnected with overhead portions of the body.

15. The suspension system according to claim 13, wherein said spring means are mounted on said wheel-mounting members and interconnected with overhead portions of the body.

16. The suspension system according to claim 1:

(A) further comprising axle means extending across the body to interconnect laterally related vehicle support means;

(B) wherein said tie assembly means comprises a nominally upright member having its upper end portion pivotally connected to said body by said first interconnection means; and wherein said second interconnection means interconnecting a lower portion of said upright member to said axle means to permit said upright member to pivot relative to said axle means and simultaneously slide lengthwise of said upright member relative to said axle means while restraining said upright member against movement relative to said axle means in the direction transversely to the length of said upright member.

17. The suspension system according to claim 16, wherein said vehicle support means include wheel-mounting members, and wherein said spring means are mounted on or closely adjacent said wheel-mounting members.

18. The vehicle suspension system according to claim 17, wherein said spring means have a lower portion fixedly connected to said axle means at locations closely adjacent said wheel-mounting members and upper end portions interconnected with overhead portions of the body.

19. The suspension system according to claim 1:
(A) further comprising axle means extending across the body to interconnect laterally related vehicle support means;
(B) said tie assembly comprising a transverse tie structure extending laterally across the body;
(C) said first interconnecting means pivotally interconnecting said tie structure to said body at an effective location above the reaction center; and
(D) said second interconnecting means including arm assemblies pivotally interconnected at one end portion to said axle means and at opposite end portions to outer end portions of said transverse tie structure.

20. A suspension system for a wheeled vehicle, said suspension system comprising:
(A) wheel-mounting assemblies for the wheels, each wheel-mounting assembly having a stub axle thereon;
(B) arm assemblies having first end portions pivotally connected to corresponding wheel-mounting assemblies;
(C) an upright member pivotally connected to the second end portion of each of said arm assemblies;
(D) a tie assembly:
 (i) extending transversely across the body;
 (ii) having outer end portions pivotally interconnected with corresponding upright members; and
 (iii) having means for pivotally connecting said tie assembly to the body at a roll axis in such a manner to tilt the body in the direction opposite to the direction of the lateral forces acting on the vehicle body, such as during cornering;
(E) a pair of generally transverse upper link members having their outer end portions pivotally connected to corresponding upright members at a location above the locations that the tie assembly is interconnected to said upright members and having their inward end portions pinned to the body at location(s) spaced above the elevation in which said tie assembly is connected to the body; and,
(F) spring means for supporting the weight of the body thereon on said wheel mounting assemblies.

21. The suspension system according to claim 20, wherein each of said arm assemblies include a pair of upper and lower trailing arms pivotally connected at first end portions to corresponding wheel-mounting members and pivotally connected at second end portions to corresponding upright members.

22. The suspension system according to claim 20, wherein: said tie assembly includes upwardly extending portions; and, said connection means pivotally interconnecting said upwardly extending portion of said tie assembly to the body at locations above the reaction center.

23. The suspension system according to claim 22, wherein said tie assembly includes a generally triangularly shaped tie structure extending laterally across the body and said connection means interconnecting the upper apex portion of said triangular tie structure to the body.

24. The suspension system according to claim 22, wherein said tie assembly includes a tie structure generally in the shape of an inverted Tee composed of a lower transverse member and a central, upwardly extending member and said connection means interconnecting said upwardly extending member to the body.

25. The suspension system according to claim 20, wherein said tie assembly includes:
(A) a cross member extending transversely across the body to pivotally interconnect with corresponding upright members; and
(B) a pair of diagonal, lower link members having their lower end portions pivotally connected to the cross member at spaced-apart locations along the cross member, said lower link members extending generally diagonally upwardly from said cross member and inwardly to pivotally interconnect with the body at laterally spaced-apart locations on said body.

26. The suspension system according to claim 25, wherein said lower link members are nominally oriented so that lines extending along the length of said lower link members intersect each other at a location above the reaction center.

27. The suspension system according to claim 26, wherein said lines nominally intersect each other at the lateral center of the body.

28. The suspension system according to claim 20, wherein said spring means extend upwardly from said arm assemblies to interconnect with the body at locations laterally offset from the lateral center of the body.

29. The suspension system according to claim 20, further comprising forward antiroll means to limit the swing of the body relative to said tie assembly.

30. The suspension system according to claim 20, further comprising rear antiroll means to limit the swing of the body relative to said tie assembly.

31. The suspension system according to claim 1, wherein said spring means are connected to the body.

* * * * *

UNITED STATES PATENT AND TRADEMARK OFFICE
CERTIFICATE OF CORRECTION

PATENT NO. : 4,550,926
DATED : November 5, 1985
INVENTOR(S) : William L. MacIsaac It is certified that error appears in the above-identified patent and that said Letters Patent is hereby corrected as shown below:

Column 8, line 14, "constain" should be --constrain--
line 43, "hardward" should be --hardware--
Column 9, line 12, Insert --pins-- after "assembly"
line 64, Insert --upright-- after "outside"
Column 10, line 18, "assist" should be --assists--
Column 12, line 35, "porions" should be --portions--
Column 15, line 40, Insert --systems-- after "suspension"
Column 17, line 42, Insert --;-- after "means"
Column 20, line 6, "wheel mounting" should be --wheel-mounting--

Signed and Sealed this

First Day of April 1986

[SEAL]

Attest:

DONALD J. QUIGG

Attesting Officer

Commissioner of Patents and Trademarks